Figure 1:
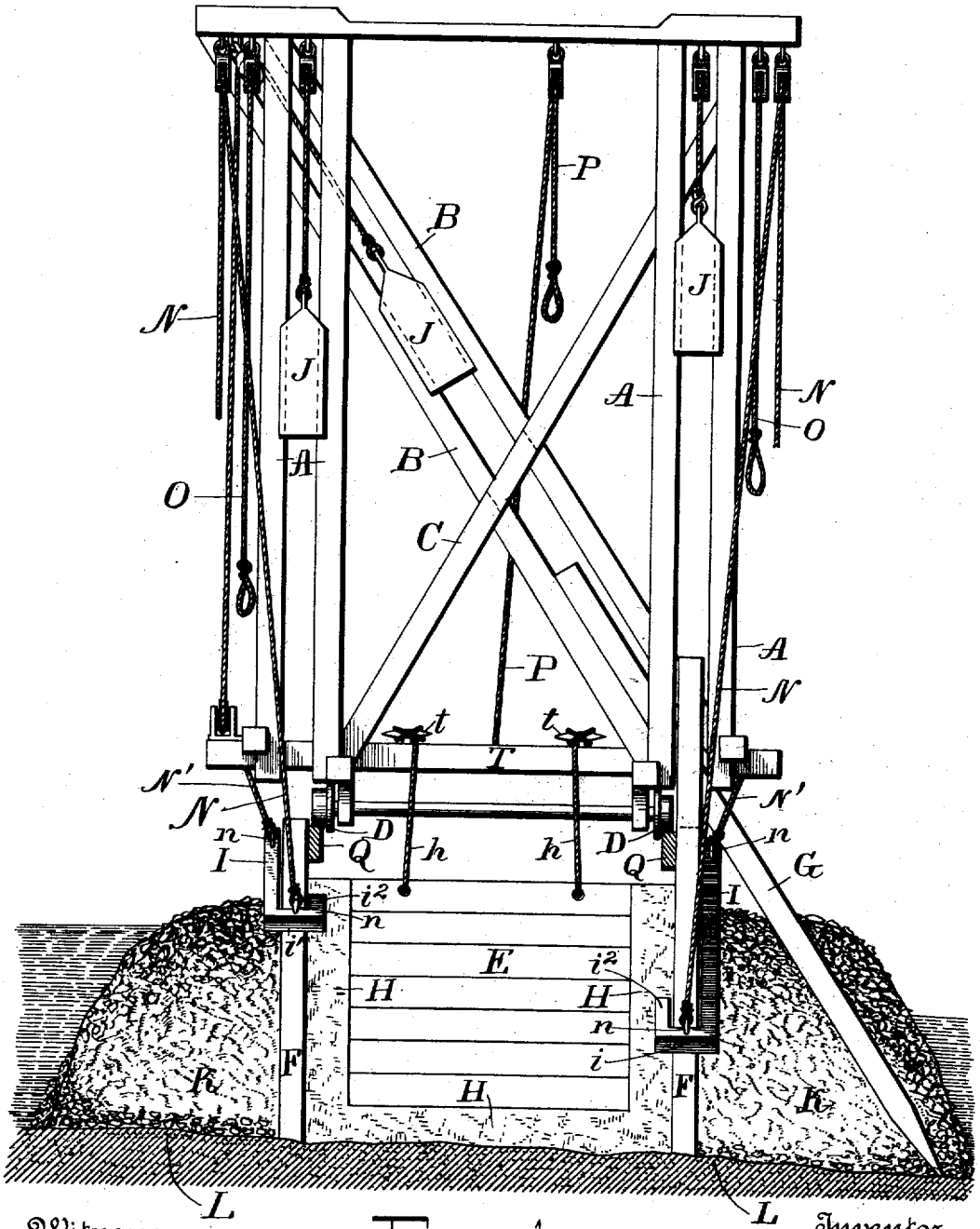

2 Sheets—Sheet 1.

W. BAPTIST.

APPARATUS FOR DRIVING PILES IN RUNNING WATER.

No. 11,429. Reissued July 10, 1894.

Witnesses
Percy C. Bowen
J. Ericson

Inventor
William Baptist,
By Whitman & Atkinson
Attorneys.

THE NORRIS PETERS CO., PHOTO-LITHO., WASHINGTON, D. C.

2 Sheets—Sheet 2.
W. BAPTIST.
APPARATUS FOR DRIVING PILES IN RUNNING WATER.
No. 11,429. Reissued July 10, 1894.
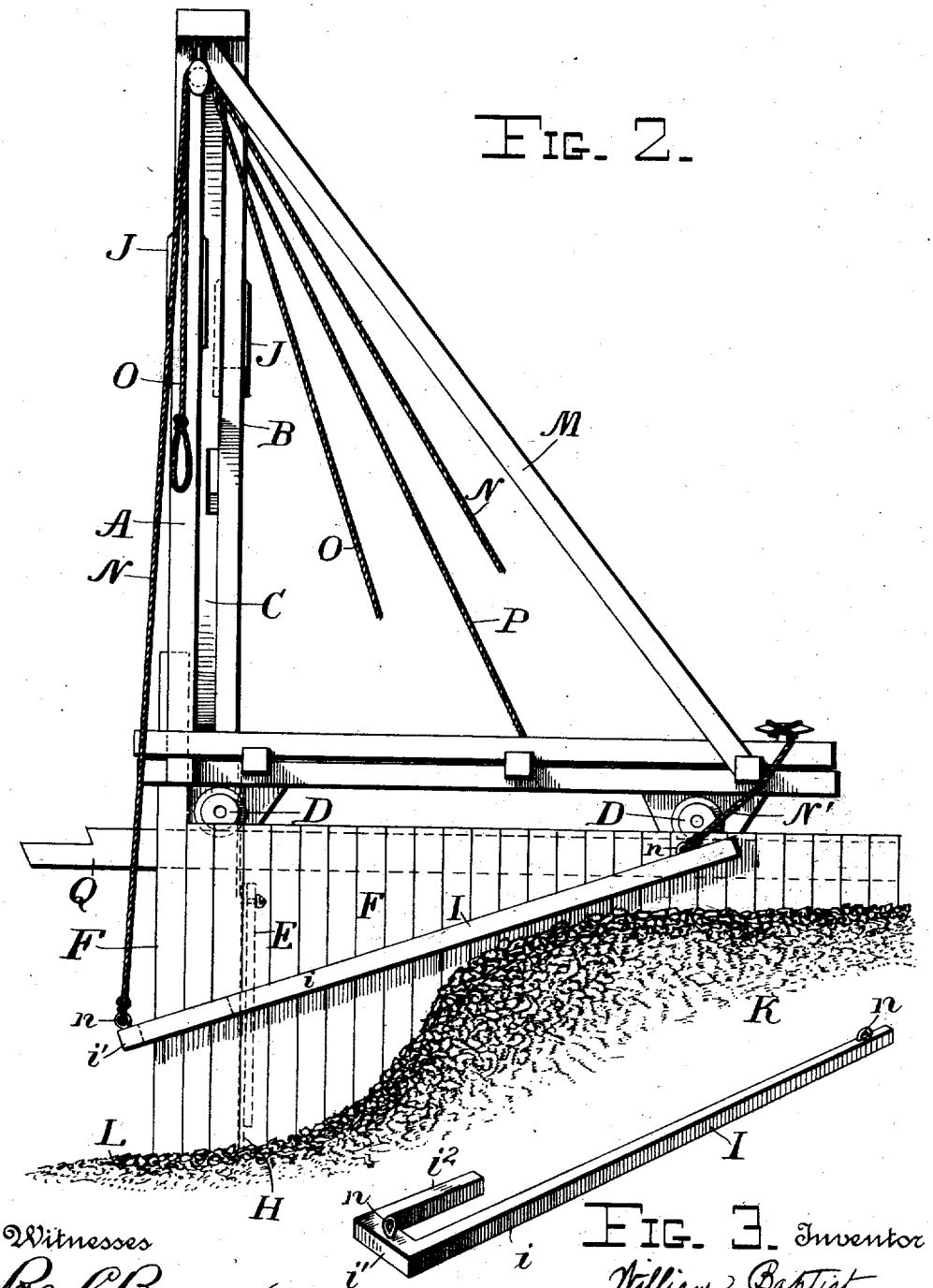
Witnesses
Reyl. C. Bowen.
J. C. Wilson.
Inventor
William Baptist,
By Whitman & Wilkinson,
Attorneys.
THE NORRIS PETERS CO., PHOTO-LITHO., WASHINGTON, D. C.

UNITED STATES PATENT OFFICE.

WILLIAM BAPTIST, OF NEW ORLEANS, LOUISIANA.

APPARATUS FOR DRIVING PILES IN RUNNING WATER.

SPECIFICATION forming part of Reissued Letters Patent No. 11,429, dated July 10, 1894.

Original No. 510,873, dated December 12, 1893. Application for reissue filed June 5, 1894. Serial No. 513,593.

*To all whom it may concern:*

Be it known that I, WILLIAM BAPTIST, a citizen of the United States, residing at New Orleans, in the parish of Orleans and State of Louisiana, have invented certain new and useful Improvements in Apparatus for Driving Piles in Running Water; and I do declare the following to be a full, clear, and exact description of the invention, such as will enable others skilled in the art to which it appertains to make and use the same.

My invention relates to an improvement in apparatus for driving piles in running water, and its novelty will be fully understood when taken in connection with the annexed drawings and specification; and the objects of my invention are to construct a pile driver for closing crevasses, driving heavy piles or sheet piling in rapid running streams, and enabling one, two or three piles to be driven at one operation. I attain these objects by mechanism illustrated in the accompanying drawings, in which—

Figure 1 is a front view. Fig. 2 is a side view, and Fig. 3 a perspective view of the guide for the piles.

Similar letters refer to similar parts throughout the several views.

In the drawings A are upright pieces of timber, and are so constructed as to form guides for weights J to travel up and down.

B are two diagonal guides for the weight J driving the brace pile, and acting as braces of pile driver.

C is a brace.

D are the wheels of the truck of the pile driver, which enable same to move back and forth on the track Q, made of pieces of scantling secured to the piling.

E is a gate which is adjusted in such a manner as to swing loosely upon a cross frame piece attached to the frame or to the track Q, the ends H of said gate being padded or covered with rubber or other plastic material to prevent water from washing out the filling or soil deposited between the rows of piles, the said gate is suspended by means of ropes or chains $h$ from the cleats $t$ on the timber T, which forms one of the transverse timbers of the truck on which the pile drivers are mounted.

F shows piles driven.

G is a brace pile which is placed on an incline and which can be used where it is necessary to form a brace, and is driven by means of a weight J shown in Fig. 1. This pile braces the structure against pressure from the higher water on the outside of the crevasse.

M is a brace.

N is a rope for operating the guide I, and enabling the pile to be held in position against the pressure of the water when placing the pile in position for driving. This guide I is L-shaped having the heel $i'$ firmly secured to the shank $i$, to which heel is secured the elongated toe $i^2$ which is made long enough to lap over several of the piles to be driven. The toe $i^2$ is made parallel to the shank $i$ and distant therefrom a trifle more than the thickness of one of the piles to be driven. The guide I is adjusted by means of the ropes N and N′ engaging in the eyebolts $n$.

O is a rope for pulling up a pile for driving.

P is the rope for pulling up the brace pile G.

K is the levee.

L is the bed or washout of the levee.

The mode of operation is as follows: The wheels D of the truck are placed upon the track Q, which rests upon the top of the embankment or levee, which forms the cage or shore of a running stream, and the pile driver is run out upon the track, and sheet or other desired piling is driven as shown at F in Fig. 2, the piling being driven on each side of the track Q, thus forming two rows of pile, with the piles G to form a brace. As the piles are driven and the track Q is extended farther across the crevasse, I am enabled to place between the rows of piles a sufficient amount of soil and other filling to form an embankment, and by means of the door E the soil is prevented from washing out. The guides I may be used on each side of the track Q, and in running water are of great advantage in handling a pile, holding same in proper position between the shank $i$, the heel $i'$ and the toe $i^2$, against the pressure of the water, and being easily operated by means of the ropes N and N′.

Where desired three piles may be driven at one operation, or if preferable one or two may be driven at once, as necessity may require, or heavy piling may be driven inside and sheet piling outside, or vice versa, at the same time.

A striking advantage of my device is the economical construction of same, and enabling three piles to be driven at one operation in running water.

Having thus described my invention, and the manner in which the same is to be operated, I would say in conclusion that I do not limit myself to the precise details described and shown, as the same may be varied to some extent, but

What I claim, and desire to secure by Letters Patent, is—

1. In a pile-driver, the combination of the piles and means for driving them, with the door hung between two of the said piles and provided with a padding, substantially as and for the purposes described.

2. In a pile driver, the combination of the piles and means for driving them, with the door loosely hung between two of the piles, and the ends H secured to the door, and provided with padding, substantially as and for the purposes set forth.

3. In a pile driver, the vertical weight guides A, the weight guide B extending diagonally across the vertical guides, and means for operating the weights, combined with the piles, and the door hung below and between two of the said piles and provided with padding, substantially as and for the purposes set forth.

4. In an apparatus for driving piles in running water, the combination with two rows of piles approximately parallel and means for driving them, of a door provided with padding and hung loosely between said rows of piles, substantially as and for the purposes described.

5. In an apparatus for driving piles in running water, the combination with two rows of piles approximately parallel of a movable pile driver mounted over said rows of piles, and a door suspended beneath said pile driver hung loosely between said rows of piles and provided with padding, substantially as and for the purposes described.

6. In an apparatus for driving piles in running water, an L-shaped pile guide and holder having a shank adapted to pass along one side of a number of the driven piles and a toe adapted to pass along the opposite side of a plurality of the driven piles and to inclose between said shank and toe the pile being driven, substantially as and for the purposes described.

7. In an apparatus for driving piles in running water, an L-shaped pile guide and holder having a shank adapted to pass along one side of a number of the driven piles and a toe adapted to pass along the opposite side of a plurality of the driven piles and to inclose between said shank and toe the pile being driven, and ropes or chains secured to each end of said guide for adjusting the position of the same, substantially as and for the purposes described.

In testimony whereof I affix my signature in presence of two witnesses.

WILLIAM BAPTIST.

Witnesses:

THOS. E. EVERSHED,

W. MORGAN GURLEY.